United States Patent [19]

Inoue

[11] 4,247,303

[45] Jan. 27, 1981

[54] METHOD OF FORMING AN ELECTRICALLY CONDUCTIVE ABRASIVE WHEEL

[75] Inventor: Kiyoshi Inoue, Tokyo, Japan

[73] Assignee: Inoue-Japax Research Inc., Yokohama, Japan

[21] Appl. No.: 610,378

[22] Filed: Sep. 4, 1975

[30] Foreign Application Priority Data

Sep. 4, 1974 [JP] Japan .................................. 49-102363
Sep. 5, 1974 [JP] Japan .................................. 49-102688
Oct. 25, 1974 [JP] Japan .................................. 49-122596

[51] Int. Cl.³ .......................... B24D 7/18; B23P 1/00
[52] U.S. Cl. ........................................ 51/295; 51/308; 51/309; 106/1.13
[58] Field of Search ............... 51/295, 293, 308, 309, 51/296; 106/1.13

[56] References Cited

U.S. PATENT DOCUMENTS

| | | | |
|---|---|---|---|
| 2,798,809 | 7/1957 | Goetzel et al. .......................... | 51/295 |
| 3,216,854 | 11/1965 | Halverstadt .............................. | 51/295 |
| 3,310,390 | 3/1967 | Nehru et al. ............................. | 51/295 |
| 3,520,666 | 7/1970 | Meyer ...................................... | 51/295 |
| 3,535,832 | 10/1970 | Amero ..................................... | 51/295 |
| 3,594,141 | 7/1971 | Houston et al. ......................... | 51/295 |
| 3,663,191 | 5/1972 | Kroder .................................... | 51/295 |
| 3,776,740 | 12/1973 | Silvertz et al. .......................... | 106/1 |
| 3,893,865 | 7/1975 | Franz et al. .............................. | 106/1 |

Primary Examiner—Donald J. Arnold
Attorney, Agent, or Firm—Karl F. Ross

[57] ABSTRACT

A method of producing electrochemical-abrasive machining tools in which the abrasive body, e.g. a wheel, is impregnated with a chemical plating solution from which a metal is deposited in the interstices of the tool between the abrasive grains. Instead of the usual practice of forcing the chemical plating solution through the tool continuously so that only part of the metal is depleted from the solution, the invention provides for forcing the solution into the interstices and retaining it there for a predetermined time sufficient, preferably, to chemically plate all of the metal from the solution onto the walls of the interstitial spaces of the tool.

4 Claims, 4 Drawing Figures

METHOD OF FORMING AN ELECTRICALLY CONDUCTIVE ABRASIVE WHEEL

The present invention relates to the art of producing an electrochemical-abrasive machining (EC-AM) tool electrode from an electrically nonconductive porous abrasive body and, more particularly, to a method of imparting an electric conductivity to such bodies for the production of EC-AM tool electrodes therefrom.

EC-AM is defined as a machining process in which two distinct machining actions, in combination, are simultaneously carried out upon a workpiece: the electrolytic dissolution of material from the conductive workpiece by passing a high-density electric current between the workpiece and a tool electrode through an electrolyte which serves as an electrochemical machining medium; and the mechanical abrading of the tool surface against the workpiece surface. In a finishing operation subsequent to the machining process, only the mechanical action may be utilized using the same tool to give the machined body a shining surface. It is desired that the tool (electrode) be given good electric conductivity and mechanical capability.

Typical tool electrodes which have been used heretofore for machining processes of this genre are metal bonded diamond or other abrasive wheels which have relatively good conductivity. These bodies are, however, not of bond strength. Abrasive particles tend to dislodge rather quickly from the conductive substrate and the tool undergoes considerable wear in the course of a machining operation. In addition, they are comparatively expensive to manufacture and poor in shapability.

In order to overcome these difficulties, it has been proposed to apply electroless or chemical plating techniques to the tool production. These techniques can effectively be utilized to impart electric conductivity to commerically available abrasive bodies which are of a sufficient bond strength and have other advantages but are electrically nonconductive or poor in conductivity. The abrasive body with inner interconnected pores is impregnated with a chemical plating solution so that a conductive coating builds up on the wall portions of the pores by chemical reduction of a metal from the solution. In the known production method, however, the chemical plating solution is continuously forced through the abrasive body, e.g. wheel, by applying a pressure difference on the opposite sides of the porous body. The solution thus passes through the body quickly with only a small proportion thereof bringing about the chemical reduction inside the body and must be recycled until a desired amount or thickness of the metallic coating is achieved on the pore walls. Metal deposition from the solution may also occur in the recycling conduits and vessels and as a result a significant proportion of the reductive metal in the solution may be consumed outside the abrasive body to be rendered conductive. Thus, in addition to the low production efficiency and the inefficient use of a plating solution, the prior-art method has the disadvantage that the equipment may be quickly contaminated and give rise to particular maintenance problems.

The principal object of the present invention is to provide an improved method whereby the chemical plating of a porous abrasive body to render it conductive can be accomplished more efficiently and economically than the prior-art method and a number of EC-AM tool electrodes having a uniform excellent quality can be produced.

Another object of the present invention is to provide an apparatus fo executing the method.

According to the present invention, the method of imparting an electric conductivity to an electrically non-conductive porous abrasive body to produce an electrochemical-abrasive tool electrode therefrom comprises the steps of: (a) impregnating a predetermined amount of a chemical plating solution into said porous body; (b) confining said impregnated solution within the interconnected pores of said porous body for a predetermined time period to cause a metallic coating to be reductively deposited from said solution onto the wall portions of said pores; (c) draining the waste solution away from said pores and simultaneously introducing a substantially equal amount of fresh solution into said pores to again impregnate the latter therewith, followed by the step (b); and (d) repeating the step (c) a predetermined number of times.

Any abrasive body which is commercially available may be treated in accordance with the present invention. Thus, it may be a vitrified, silicate, rubber, rubber-reinforced, resinoid, resinoid reinforced, shellac or oxychloride abrasive body of silicon carbide, boron carbide, aluminum oxide, zirconium oxide, zinc oxide, titanium oxide, diamond etc. A body having such an abrasive and bond composition and further of a grain size finer than 100 meshes and of a porosity between 10 and 60% is, in general, preferable to form a high-performance EC-AM tool.

The chemical plating solution may, as is conventional, include a reducing agent as well as a salt of a metal to be reduced. The former and a liquid containing the latter are, in accordance with the present invention, preferably mixed together immediately prior to impregnation into the abrasive body in a manner to be described hereinafter. It follows that in each impregnating cycle, the given amount of a highly active solution is confined within the pores for a predetermined time period, namely until the reductive metal salt included therein is substantially completely depleted by deposition of the metal upon the pore wall portions of the body.

The chemical plating operation is, of course, preceded by various pre-treatment operations including cleaning, sensitizing and activating processes which are well known in the art of chemical plating.

An apparatus for carrying out the present method comprises a vessel, means for supporting a porous abrasive body to be rendered conductive in said vessel, and means for imtermittently applying a pressure difference on the opposite sides of said body to impregnate the latter with a predetermined amount of a chemical plating solution and intermittently renewing the solution therein.

In accordance with a further aspect of the present invention, the waste solution drained from the porous body is led to a solution treatment tank in which the residual main component (plating metal) is electrochemically separated and recovered and a solution containing the other components than the separated metal is led to a sedimentation tank in which a major component or components may be made available for recycling.

These and other features and advantages of the present invention will become more readily apparent from the following description of certain embodiments thereof, reference being made to the accompanying drawing in which.

Figure 1:
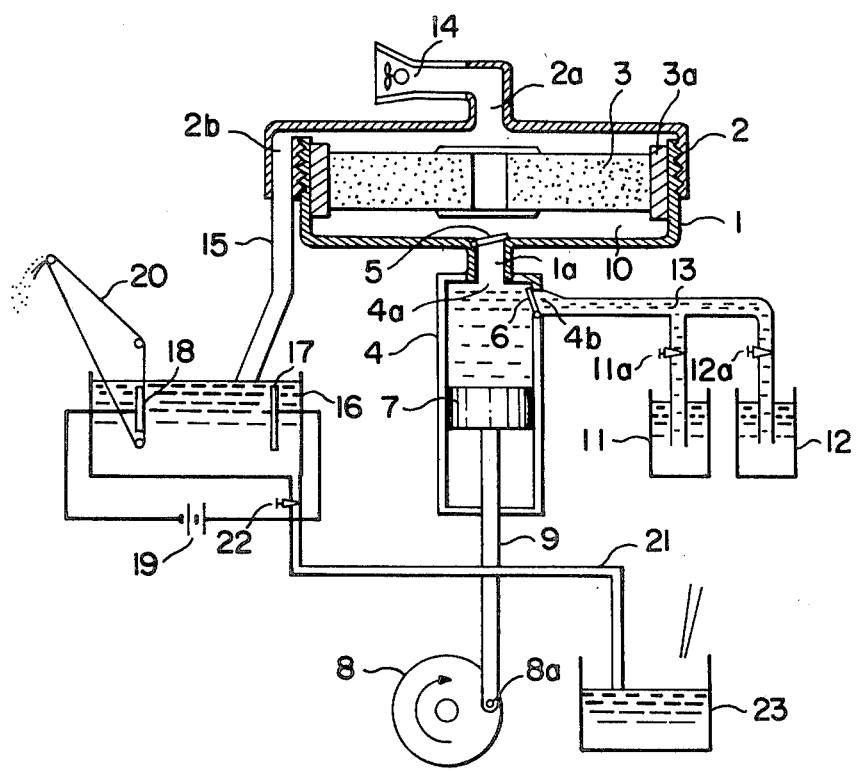
FIG. 1 is a diagrammatic sectional view illustrating an apparatus embodying the present invention.

In FIG. 1, a funnel-shaped vessel 1 and a closure member 2 tightly held together, form a chemical plating chamber 10 in which a porous abrasive body 3, in the form of a wheel, which is to be rendered conductive is positioned by an elastic supporting rim 3a as dividing the chamber 10 into upper and lower compartments as shown. A liquid inlet channel 1a at the bottom of the vessel 1 is fitted with the upper opening 4a of a cylinder 4 which intermittently supplies a chemical plating solution under pressure into the chamber 10. A check valve 5 is provided at the top opening of the channel 4a to prevent the back flow of the liquid to the cylinder 4. A second check valve 6 is provided at the liquid inlet opening 4b of the cylinder 4. A piston 7 is reciprocably mounted in the cylinder 4 and is driven by the rotation of a crank 8 to which is coupled a piston 9 at a crankshaft 8a. Reservoirs 11 and 12 containing separately two different sets of ingredients of a chemical plating solution are connected to the cylinder 4 via the inlet opening 4b and a conduit 13, there being provided valves 11a and 12a for adjusting the mixing ratio of these ingredients. The top closure member 2 is provided with a ventilator opening 2a having a fan 14 and also with an outlet opening 2b which leads via a conduit 15 to a solution-treatment tank 16 for admitting to the latter the waste solution from the chamber 10. A pair of electrolyzing electrodes 17 and 18 are disposed in the tank 16 and connected to positive and negative terminals of a DC power supply 19, respectively. The cathode 18 is arranged in contact with a displaceable endless porous belt or screen 20 for receiving the metal deposit from the waste solution and carrying it away from the tank 16 for recovery. The treatment tank 16 is coupled via a conduit 21 incorporating a valve 22, to a sedimentation tank 23 where the waste solution undergoes sedimentation for recovery of a further component.

In operation, as the crank disk 8 is rotated, the piston 7 reciprocates within the cylinder 4. During the time in which the piston 7 is in downward movement, the pressure in the space above the piston in the cylinder 4 tends to become negative. As a consequence, the valve 5 closes and the valve 6 is open, and the solution is drawn into said space from the conduit 13. When copper plating is to be performed, the reservoir 11 may receive a solution containing copper sulfate, potassium sodium tartrate and sodium hydroxide while the reservoir 12 may receive formalin as a reducing agent. The valves 11a and 12b are adjusted so that the above separated ingredients may be drawn into the cylinder 4 at a desired mixing ratio. Effective mixing is done in the cylinder 4. The amount of the solution drawn into the cylinder 4 is, of course, determined by the displacement of the piston 7. Since this displacement or stroke can be precisely fixed, the amount can be precisely fixed as desired.

When the piston commences moving upward, the valve 6 is closed because of an increasing pressure in the cylinder space which opens the valve 5. The amount of the plating solution stored in the cylinder 4 is now introduced under pressure into the treatment chamber 10. A small part of it may be forced through the body 3 with the remainder completely filling the body so that metal is reductively deposited therefrom onto the wall portions of the interconnected pores of the body 3.

As mentioned previously, the chemical plating process is preceded by pre-treatments which per se are well known in the chemical plating art. Typically, after the body is thoroughly cleaned, it is impregnated with a solution of stannous chloride to form deposits of stannous ions thereon (sensitizing). After washing, the body is impregnated with a solution of palladium chloride to form deposits of palladium thereon as an activating or catalytic substance (reduction nuclei) to receive the chemical plating metal. These pretreatments, i.e. cleaning, sensitizing and catalyzing can be done with separate baths in accordance with the chemical plating practice.

After a pre-determined distance of travel toward the upper end of the cylinder 4, the piston 7 comes to a stop and may then be held stationary for a predetermined period of time to confine the impregnated solution within the pores of the body 3 until the metal content therein is substantially depleted. The piston 7 may then be re-driven downwardly to have the fresh solution in the same given amount drawn into the cylinder 4 from the supply conduit 13. Since the formalin induces a reduction reaction spontaneously, it is desirable to store it separately from other ingredients and cause them to be mixed together immediately prior to the introduction into the body 3 in the manner as illustrated and described.

A representative copper chemical plating solution contains 10 grams/liter of copper sulfate (2.56 grams/liter of copper), 50 grams/liter of potassium sodium tartrate, 15 grams/liter of sodium hydroxide and 25 cc/liter of formalin (38% formaldehyde). Using a solution of such composition by way of example and with an arrangement as shown in FIG. 1, a given amount of the solution was impregnated into a porous abrasive body and held therein for five minutes whereupon it was drained off under pressure. The solution flowing out was transparent and contains 0.6 grams/liter of copper sulfate (160 milligrams/liter of copper), 50 grams/liter of potassium sodium tartrate, 14 grams/liter of sodium hydroxide and 9 grams/liter of formalin.

The waste solution is carried by the conduit 15 for collection by the tank 16, and hydrogen and other gaseous reaction products are vented from the chamber 10 with the aid of the fan 14 provided in the duct 2a.

A single plating cycle by the single stroke of the reciprocation of the piston 7 is not satisfactory to render the body 3 sufficiently conductive. Thus, the renewal of the solution in the chamber 10 by the reciprocation of the piston 7 is carried out a predetermined number of times depending on the nature, size and material of the abrasive body 3 to be rendered conductive.

The waste solution in the tank 16 is electrolyzed. Copper electrolytically deposited from the solution onto the belt 18 is conveyed thereby to a recovery site. The copper concentration of 160 milligrams/liter in the solution may be reduced to 0.2 miligrams/liter.

With the valver 22 opened, the treated solution is carried by the conduit 21 into the sedimentation tank 23 where, by adding 40 grams of potassium chloride per liter of the solution, a sedimentation of potassium tartrate is obtained from which potassium sodium tartrate may be recovered.

The main components of the plating solution may thus be substantially recovered, permitting the process to be carried out economically and without giving rise to environmental pollution.

Figure 2:
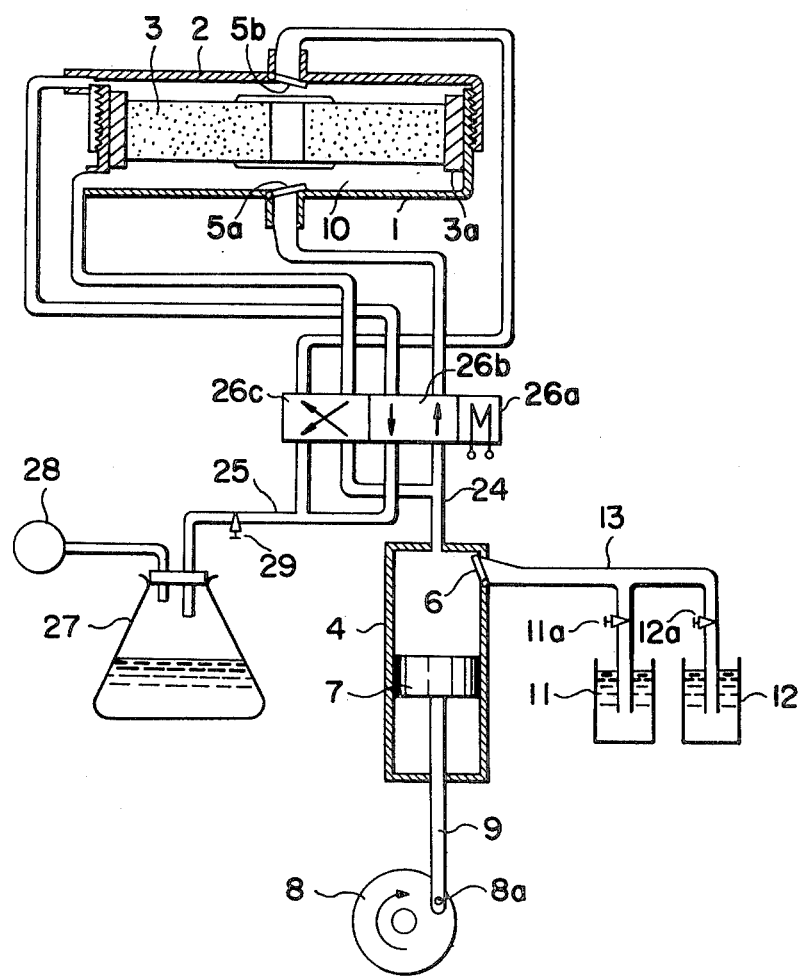
FIG. 2 is a diagrammatic sectional view of an apparatus similar to that of FIG. 1, further including means for altering the impregnating directions of the chemical plating solution.

While the solution impregnation is always in the same direction with the embodiment of FIG. 1, this direction may be altered every single cycle or for several impregnation cycles. This can be performed using an arrangement illustrated in FIG. 2 in which same reference numerals denote same parts of elements as in FIG. 1. The embodiment of FIG. 2 includes a liquid supply line 24 and a drain line 25, each channeled and communicating with the treatment chamber 10 as shown, the channels traversing an electromagnetically operated switch valve station 26. The periodic energization of coil 26a synchronized with the displacement of the piston 7 opens valves 26b and 26c alternately to cause the direction of the solution impregnation through the abrasive body 3 in the chamber 10 to be reversed periodically. The apparatus of FIG. 2 also includes a solution collecting vessel 27 provided with a vacuum pump 28 which is operated synchronously with the piston 7 to facilitate the intermittent solution renewel through the body 3 in the treatment chamber 10. A check valve 29 is also provided in the drain line 25.

Figure 3:
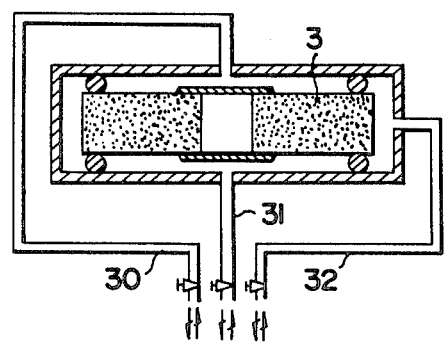
FIG. 3 is a diagrammatic sectional view illustrating a modified arrangement of FIG. 2.

The treatment chamber 10 shown in FIG. 3 is provided with three lines 30, 31 and 32 communicating with the upper, lower and lateral sides thereof, respectively. These lines serve alternately as supply and drain lines and any two may be utilized as alternate supply and drain lines depending on the nature of the abrasive body to be rendered conductive to enable an optimum impregnating plating thereof to be accomplished. It is also possible to supply a pressurized gas (preferably inert gas) through the line 32 and to permit the solution to be discharged through the line 30 or 31, or alternatively to apply a suction through the line 32 for the removal of the waste solution therethrough prior to entry of a fresh solution in the next impregnation cycle.

Figure 4:
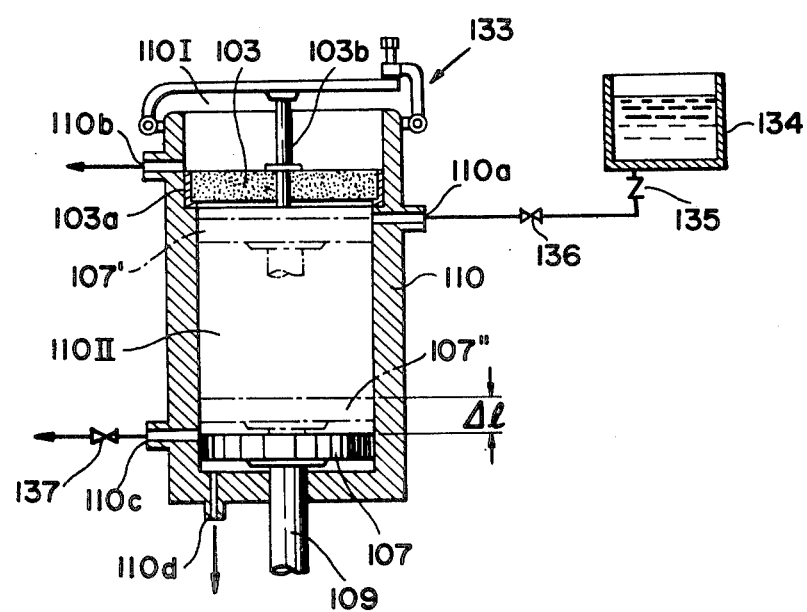
FIG. 4 is a diagrammatic sectional view of another form of the apparatus embodying the present invention.

In FIG. 4, showing an alternative form of the apparatus embodying the present invention, a cylinder 110 forms a treatment chamber in which an abrasive body 103, again in the form of a wheel, to be treated is mounted upon a supporting rim 103a. In this embodiment, a hinge arrangement 133 is provided to position the wheel 103 having a shaft 103b coupled thereto against the supporting rim 103a.

The wheel 103 is here again arranged to divide the chamber 110 into an upper and lower compartments 110I and 110II. In the lower compartment 110II there is provided a piston 107 reciprocable between the positions indicated by the solid line 107 and the dot-dash line 107', respectively.

The chamber 110 is provided with an inlet opening 110a, an overflow opening 110b and drain openings 110c and 110d. The inlet opening 110a is connected to a supply reservoir 134 of plating solution via a check valve 135 and a manually operated valve 136. The drain opening 110c is provided with a manually operated valve 137 which is normally closed.

In operation, after positioning the wheel 103 in place, the valve 136 is first opened and the piston 107 is lowered to the position indicated by the solid line to allow the chemical plating solution to be introduced into the lower compartment 110II of the chamber. The valve 136 is then closed and the piston 107 is displaced upwardly by a distance $\Delta l$ which is slightly larger than the thickness of the wheel 103 to the position indicated by the dash line 107". The pressure which develops in the compartment 110II causes a thorough impregnation of the wheel 103 with the plating solution. Since inner surfaces of the wheel 103 has already been catalyzed in a pre-treatment as mentioned previously, the solution impregnated within the pores is reduced to form deposits of metal onto the catalyzed wall portions of the pores and chemical plating proceeds over the entire porous region of the wheel 103.

When a decrease in an end to the generation of reduction formed bubbles in observed, indicating a substantial depletion of the plating component, the piston 107 may be displaced further upwardly by the distance $\Delta l$ to renew the impregnated solution and to allow the renewed solution to be confined within the wheel 103 for a next predetermined time period until such a depletion takes place. The waste solution flowing out is carried by the overflow piping 110b into a collection tank (not shown) of the type described previously. The cycle is repeated until the piston reaches the position indicated by 107' whereupon the wheel 103 is removed for washing and drying.

I claim:

1. A method of imparting an electric conductivity to an electrically nonconductive porous abrasive body to form an electrochemical-grinding wheel therefrom with a chemical plating solution comprising a reducing agent and a liquid containing a reducible metal salt, the method comprising the steps of:
   (a) holding said reducing agent and said liquid separately in different reservoirs and mixing said reducing agent and said liquid together immediately prior to impregnation into said body to form said chemical plating solution;
   (b) impregnating a predetermined amount of said chemical plating solution into said porous body immediately upon mixing of said liquid with said agent as an impregnating solution;
   (c) confining said impregnating solution within the interconnected pores of said porous body for a predetermined time period to cause a metallic coating to be chemically deposited from said impregnating solution onto the wall portions of said pores, said predetermined time period being sufficient for the metal to be deposited and substantially completely depleted from said solution by deposition;
   (d) thereafter introducing a substantially equal amount of fresh impregnating solution immediately upon said mixing into said pores and simultaneously discharging the depleted solution in an amount substantially equal to the amount of the fresh solution to again impregnate the latter therewith, followed by the step (c); and
   (e) repeating the step (d) a predetermined number of times.

2. A method of producing an electrochemical-abrasive machining tool electrode from a wheel having interconnected pores therein and composed of electrically nonconductive abrasive particles prebonded together into a given shape, the method comprising the steps of:
   (a) holding said wheel substantially horizontally,
   (b) bringing at least one surface of said wheel in contact with a mass of a chemical plating solution, (c) periodically reversing said surface coming in contact with said mass, (d) intermittently pressuring said mass to repetitively impregnate said wheel with a predetermined amount of said chemical plating solution and to confine said amount within said interconnected pores for a predetermined time period to cause the wall portions of said pores to be reductively plated, said predetermined time period being sufficient for the metal to be deposited and substantially completely depleted from said solution by deposition and (e) repeating the steps (c) and (d) a predetermined number of times to render said wheel electrically conductive.

3. A method of imparting electrical conductivity to an electrically nonconductive porous abrasive body having interconnected pores therein to produce an electrochemical-abrasive machining tool electrode therefrom by chemically depositing a coating of a metal onto wall portions of said pores from a chemical depositing solution containing a metal component, the method comprising the steps of:

(a) impregnating a predetermined amount of the chemical depositing solution into said body;

(b) confining the impregnated predetermined amount of the solution within the interconnected pores of said body for a predetermined period of time sufficient to deplete the content of said metal component substantially completely by deposition of the metal thereof onto said wall portions;

(c) draining the solution from which said metal component has been substantially completely depleted from said pores and simultaneously introducing there into a substantially equal amount of fresh chemical depositing solution to again impregnate said body therewith, followed by step (b), and (d) repeating step (c) a predetermined number of times.

4. A method of producing an electrochemical-abrasive machine tool electrode from an abrasive wheel having interconnected pores therein and composed of electrically nonconductive abrasive particles bonded together into a wheel shape, said method comprising the steps of:

(a) depositing said wheel substantially horizontally whereby said wheel has a lower surface;

(b) bringing the lower surface of said wheel into contact with a mass of a chemical plating solution containing a metal component adapted to deposit the metal of said component by chemical deposition; and (c) intermittently pressurizing said mass to repetitively impregnate said wheel with a predetermined amount of said chemical plating solution and confine said amount within said interconnected pores for a predetermined time period to cause the wall portions of said pores to be reductively plated with said metal and the metal to be substantially completely depleted from the confined solution before the next impregnation, the repetition in step (c) being carried out a predetermined number of times sufficient to render said wheel electrically conductive.

* * * * *